United States Patent [19]

Lader

[11] Patent Number: 5,109,799
[45] Date of Patent: May 5, 1992

[54] AUTOMATIC DRY PET FOOD DISPENSER

[76] Inventor: Ernest A. Lader, 63 Teresa Drive, Whitby, Ontario, Canada, L1N 6H9

[21] Appl. No.: 752,274

[22] Filed: Aug. 23, 1991

[30] Foreign Application Priority Data

Apr. 23, 1991 [CA] Canada ................................. 2040966

[51] Int. Cl.$^5$ ............................................. A01K 5/02
[52] U.S. Cl. .................................................. 119/51.13
[58] Field of Search ............... 119/52.1, 56.1, 51.11, 119/51.12, 51.13, 51.14, 51.15; 222/185, 650, 129, 504

[56] References Cited

U.S. PATENT DOCUMENTS

| | | | |
|---|---|---|---|
| 2,585,371 | 2/1952 | Coffing | 119/51.13 |
| 3,180,316 | 4/1965 | Chatfield et al. | 119/51.12 |
| 3,330,256 | 7/1967 | De Vaux | 119/51.12 |
| 3,683,859 | 8/1972 | Kirk | 119/51.14 X |
| 3,845,744 | 11/1974 | Carr et al. | 119/51.13 |
| 3,884,189 | 5/1975 | Ruth | 119/51.13 |
| 4,665,863 | 5/1987 | Toledo | 119/51.13 |

Primary Examiner—Gene Mancene
Assistant Examiner—Thomas Price

[57] ABSTRACT

This invention concerns itself with an Automatic Dry Pet Food Dispenser which, through unique mechanical action, releases individual measured quantities of dry pet food at specific timed intervals over a several day period. The main framework and body houses a controlled drive mechanism along with a plurality of like sized compartments having additionally a common pivotally connected lid and normally closed trap door panels located at the bottom of same. The trap door panels are released by gravitation after a supporting draw bar normally engaged therewith is withdrawn in an unobstructed tension-free straight line in its own guide channel deploying a gap allowing free-fall of the trap doors. The dry pet food is further directed and dispensed via a directional trough into a receiving bowl or container.

5 Claims, 6 Drawing Sheets

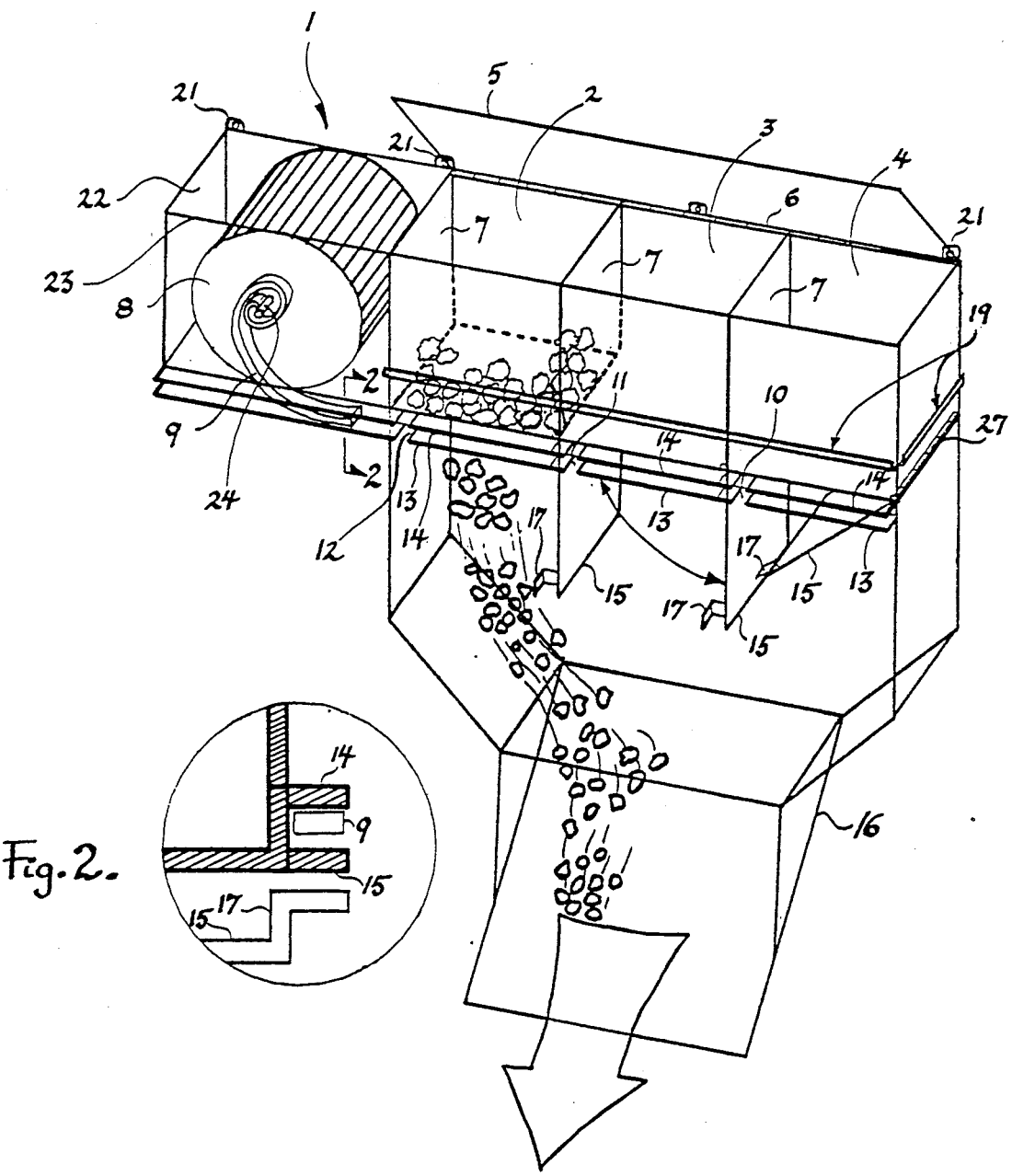

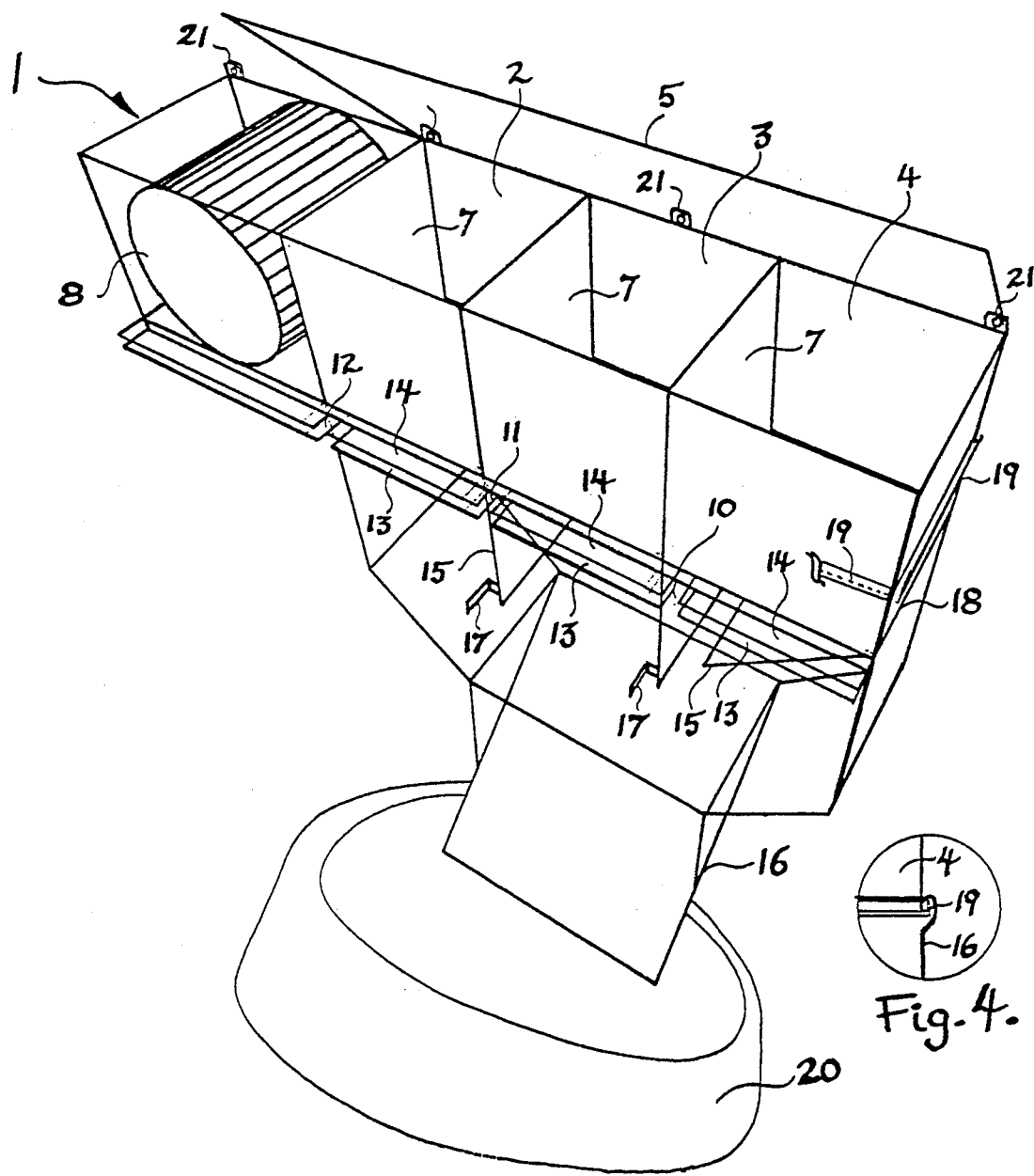

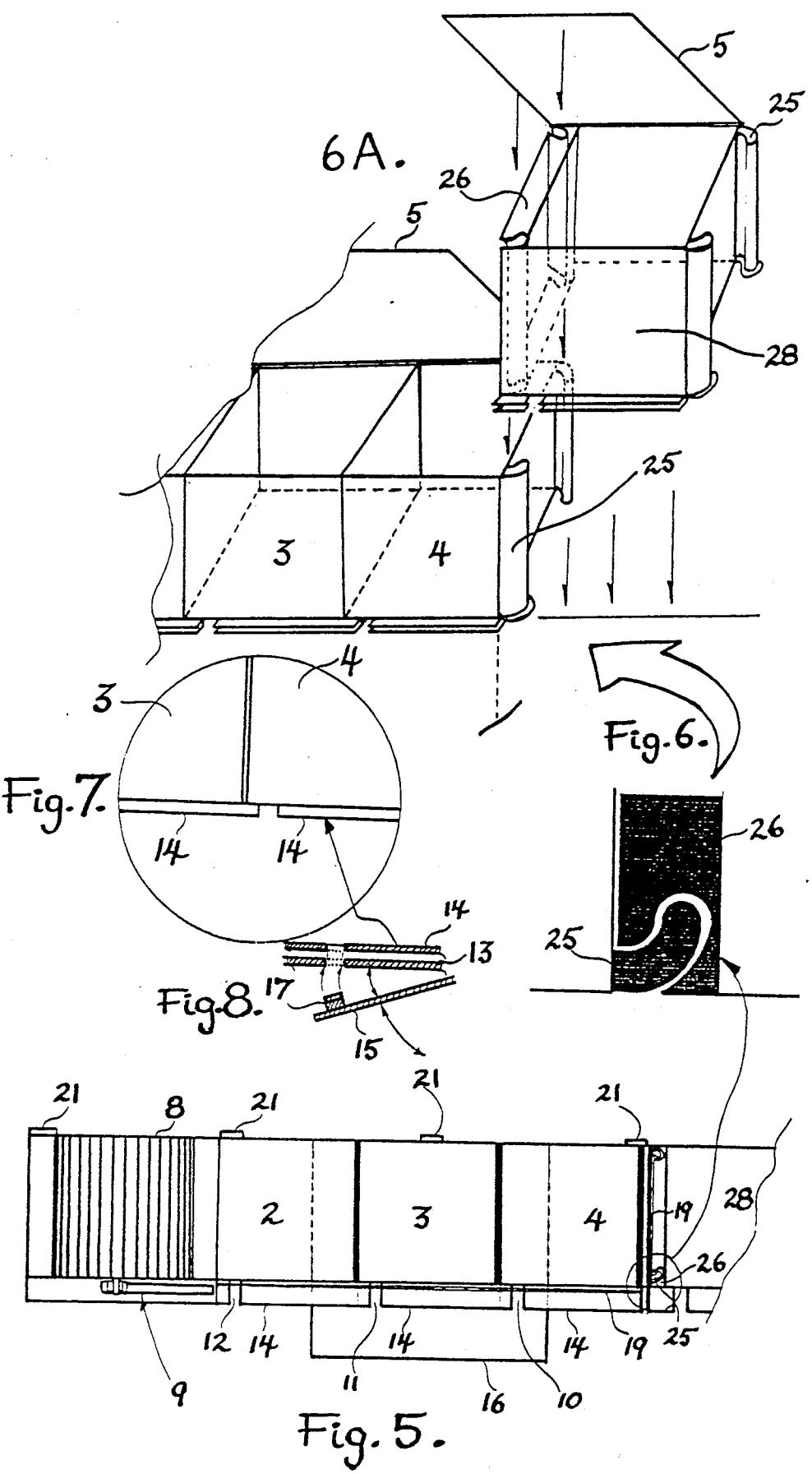

AUTOMATIC DRY PET FOOD DISPENSER

BACKGROUND OF THE INVENTION

1) SUBJECT MATTER OF THE CLAIMED INVENTION

It is not unusual for pet owners, particularly owners of cats, to leave their pets unattended for a several day period. Often arrangements to have someone else attend to the pets needs, namely feeding, cannot be made. Similarly, the modern pet owners professional and social commitments may interfere with the regular manual feeding of the pet. It has been found that an interruption in a pet's feeding routine can lead to the animal's stress and other physical and emotional problems. The present invention is intended to provide the pet owner an alternative to other largely unsatisfactory methods for ensuring that the pet is fed in his or her absence. Rather than leaving a large supply of food to be consumed by the pet during the owner's extended absence (which food is often immediately consumed), and rather than arranging for the pet to be boarded elsewhere or having someone else come to the home, the present invention provides a mechanical and effective alternative which ensures that a predetermined measure of food is dispensed at regular controlled intervals.

2) DESCRIPTION OF THE PRIOR ART

Animal feeding devices of the type concerned with the present invention are described in U.S. Pat. No(s). 2,585,371, 3,330,256, 3,180,136, 3,683,859, 3,845,744, and 4,665,863. U.S. Pat. No. 4,665,863 discloses a closed loop bead chain with one enlarged sphere therein which during its movement causes compartment latches to change position releasing associated door panels which in turn provide a feeding. This feeder has the disadvantage of having too numerous components such as latches, sprockets, pulleys and springs which complicate its operation ultimately increasing the reality of wear and mechanism disfunction. Other cited feeders are shown in U.S. Pat. No(s). 3,180,316 and 3,330,256. These mechanisms either involve sequences during operation that exposes food by drawing back a flexible cover in the former which has the disadvantage of possibly becoming misaligned or collecting food in the track potentially causing a malfunction. The latter, although providing numerous feedings has compartments with spring loaded lids which open during sequential operation. This feeder has the disadvantage of not providing safe access to the food compartments as inquisitive animals may obstruct the movement of said mechanism risking possible injury. Additional animal feeding devices shown are U.S. Pat. No(s). 2,585,371, 3,884,189, 4,665,863 and 3,845,744. These sequential type feeders incorporate mechanisms that involve dependency on components contacting each other in order to ultimately facilitate the discharge of feed from their residing compartments. The prior art does not effectively teach a simplified mechanism for sequentially activating compartments holding food in reserve. The present invention provides an automatic sequentially controlled dry pet food dispenser which has a minimum number of uncomplicated components providing a reliable and effective method of operation ensuring one's pets are properly looked after. The present invention is simplistic in the design and operation of its mechanism that would render said to be very economical to manufacture by comparison as there is presently not available an automatic dry pet food dispenser which does not incorporate costly components as part of its inherent design and construction.

SUMMARY OF THE INVENTION

The present invention is summarized as a mechanical dispensing device which is comprised of a mainframe and drive incorporating a number of individual compartments. These compartments are separated by a partition and are open at the top end having a common lid which is to be lowered and secured when the compartments are filled with the dry pet food. Each compartment is held closed at the bottom by a trap door having an integral tab which extends and rests in its normally closed position on a draw bar which is housed and supported in its own horizontal channel which is an integral part of the mainframe. This draw bar acts as the trip mechanism when it is withdrawn past the resting door tab opening. This is an advantage over previous subject matter providing simplicity and economical reliability as the only associated moving part besides the drive mechanism is the draw bar being withdrawn. The only action after disengaging the trap door is the natural gravitational path the hinged trap door would follow ultimately dispensing the compartmentalized food into a trough and receiving bowl. The feeding intervals are directly proportional to the speed at which the draw bar is withdrawn or recoiled. This will be controlled by a single motor drive correspondingly calibrated for frequency of feedings and having either a mechanical or electrical power source. The volume and frequency of feedings can be modified and further controlled by the use of integral modular add-on units which utilize their own lids, identical draw channel and trap doors which easily mate to the mainframe.

The present invention can be refilled by resetting the timer motor drive mechanism and restoring the trap doors with their respective tabs along with extending the draw bar fully to the first sequential feed compartment making sure the tabs are resting on the draw bar which acts as the latch release mechanism and holds the doors shut. Then dry pet food can be loaded in each compartment being held in support by the trap doors until the next sequential feeding cycle.

BRIEF DESCRIPTION OF THE DRAWING

FIG. 1 is a perspective view of the present invention illustrating the layout and arrangement of the food compartments, draw bar channel and food path during operational sequencing.

FIG. 2 is a sectional view of the present invention taken along line 2—2 of FIG. 1.

FIG. 3 is a differing perspective view of the present invention with the receiving bowl being illustrated.

FIG. 4 is a frontal view of the present invention taken along line 4—4 of FIG. 10.

FIG. 5 is a top view of the present invention showing the arrangement of compartments including a fragmentary of the add-on module or compartment.

FIG. 6 is a sectional view of the present invention taken along line 6—6 of FIG. 10 showing the attachment point for the modular add-on compartments. This is further detailed in the perspective View 6A showing the downward sliding travel an add-on module would take during coupling to the mainframe of the present invention.

FIG. 7 is a top view taken along line 7—7 of FIG. 10 of the draw bar channel and trap door tab gap. This is further illustrated in FIG. 8.

FIG. 8 is a frontal view taken along line 8—8 of FIG. 10 showing the trap door with its integral tab further showing how the door aligns to allow the draw bar under the tab in its normally closed position.

DESCRIPTION OF THE PREFERRED EMBODIMENT

Figure 9:
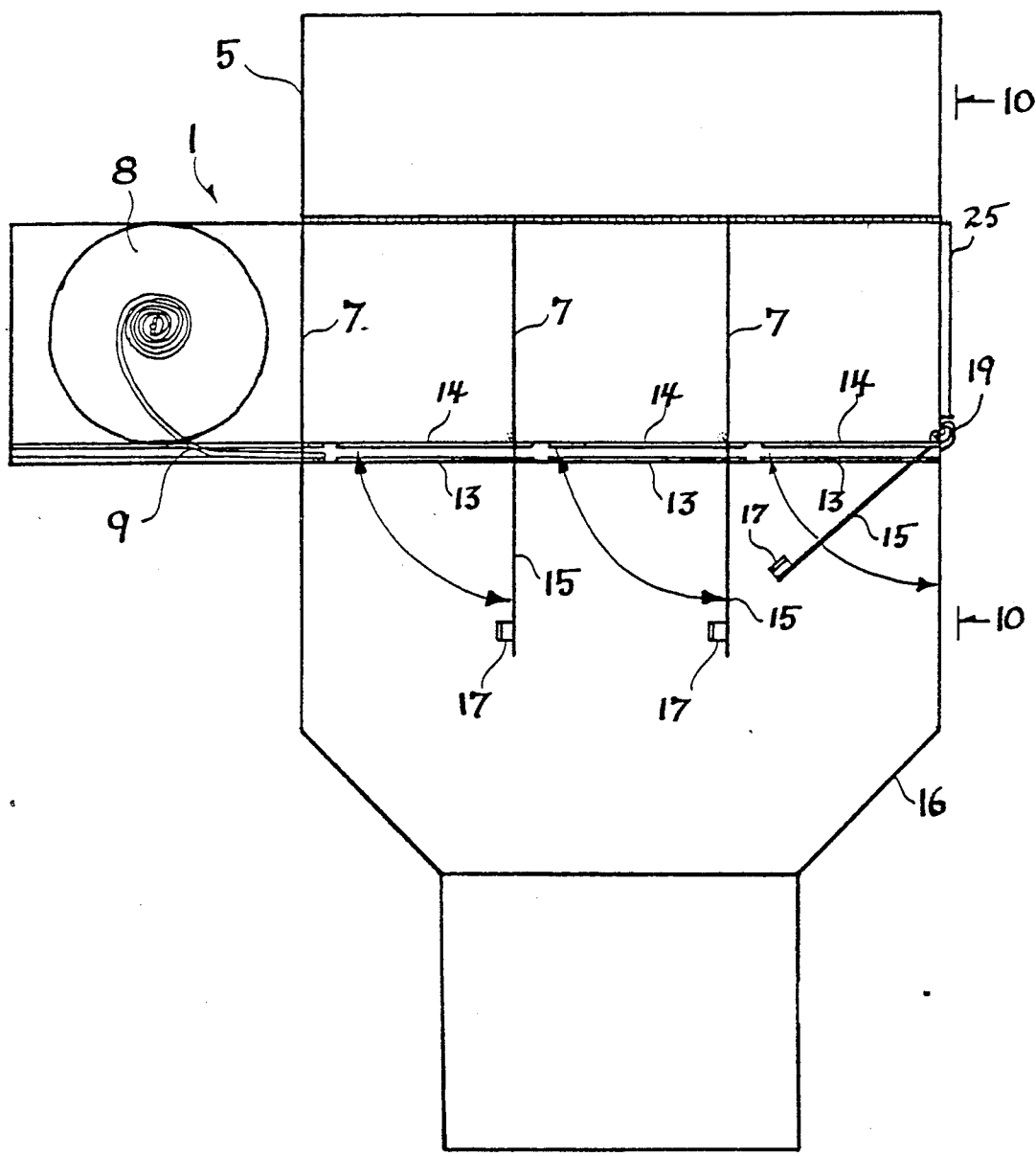
FIG. 9 is a schematic frontal view of the present invention showing the food compartments and associated trap door in the opened position.

Attention is first directed to FIG. 1 of the drawings where the numeral (1) identifies the main body and framework of the present invention which is comprised of individual dry pet food compartments along with a drive and timer mechanism. In FIG. 1 an elongated rectangular structure is shown as having an end wall (22) and a front wall (23). These walls are matched by walls being parallel which form an upright open top rectangular structure with a lid (5). The lid mechanism can be either spring tensioned or latched to secure access to the individual dry pet food compartments identified by numerals (2), (3), and (4). Each compartment (2), (3) and (4) is separated from the adjoining compartment by a dividing wall. The dividing walls are positioned transversely and are identified in each case as the number (7). To this end the partitions generally divide the structure into a collection of compartments. The compartments hold their measure of dry pet food by way of having a hinged trap door (15) at the bottom of the compartment. The hinge along the side of the trap door in an integral moulded part of the transversed partitions being identified by the numeral (27). Each trap door is identically sized and can all be identified by the numeral (15). The illustrated embodiment in FIG. 1 is shown in its most simplistic form of 3 compartments. This number may be varied upwardly by design depending on the user demand and frequency of feeding. The individual food compartments will generally be filled from the top. The measured amount of dry pet food to be dispensed is principally determined by the operator. This dry pet food will remain in the identically sized compartments until it is sequentially dispensed. The material used in the construction of the present invention can be made of injection moulded translucent plastic which will allow a clear view of the contents and working mechanism of the present invention. One of the components of the apparatus is a control drive mechanism comprised of a mechanical or electrical timer which is identified by the numeral (8). This component will provide the necessary incremental movement of the present inventions mechanism resulting in the sequential dispensing of the held dry pet food from the individual compartments (2), (3) and (4). More particularly, the timer drive mechanism (8) located at the end of the main structure of the present invention, activates a rotating crank which would be an integral part of the timer drive mechanism. This rotating crank can be identified by the numeral (24) to which is attached a flexible plastic draw bar (9). The draw bar (9) is of sufficient length allowing it to be extended when uncoiled to the furthest dry pet food compartment (4) or to additional add-on modular units as shown in FIG. 5 further identified by the numeral (5) as illustrated. Directing your attention again back to FIG. 1, when the draw bar (9) is extended and placed in its normally intended path, it will be located between the upper flange (14) and the lower flange (13). These flanges shroud the plastic draw bar (9) and create a channel through which the draw bar is extended and withdrawn. Each flange (13) and (14) will have gaps appropriately positioned by each feeding compartment and identified by the numbers (10, (11) and (12) through which a tab (17) attached to the individually hinged trap doors (15) will fit. In direct relation to this, the integral tab (17) which is illustrated as the protruding "L" shaped contour plays an important part of the trap door function when it is in a closed position and moreover, while in this position rests on the draw bar (9) when the draw bar is extended ahead of this designed trip position (10), (11) and (12). When closed, the trap door tab (17) is aligned with the upper flange (14). This can be seen by referring to the cross sectional view in FIG. 2. The draw bar (9) is illustrated having ample clearance and an unobstructed withdrawal path through the draw bar channel flanges (13) and (14) when the trap door (15) is in the closed position.

Figure 11:
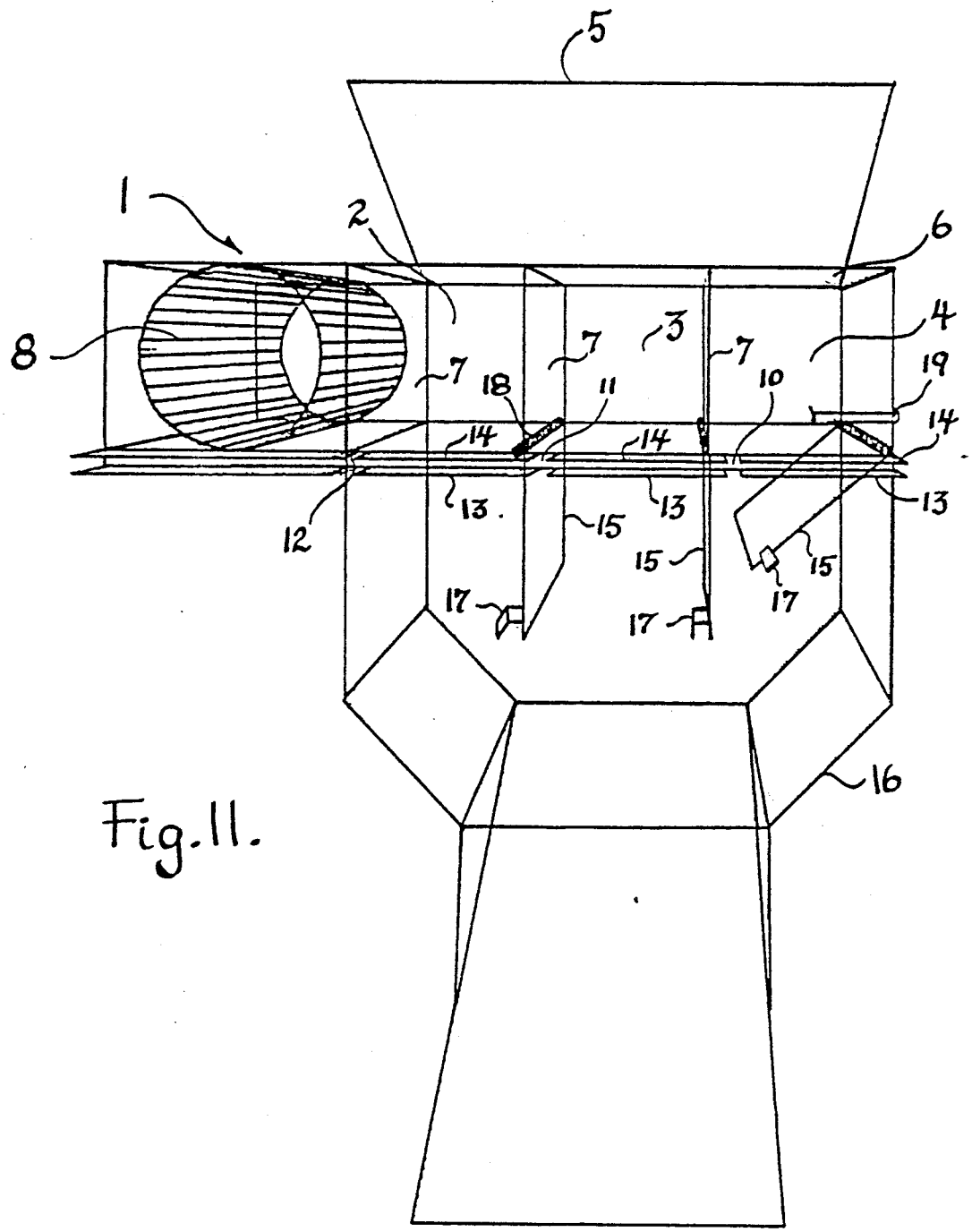
FIG. 11 is a schematic frontal perspective of the present invention.

Referring again back to FIG. 1, the operation of the present invention is further explained. To this end, when the timer drive mechanism (8) is activated, the crank (24) winds and recoils the draw bar (9) at a specific distance for any given unit of time. When the tip of the draw bar is withdrawn in the channel past the first opening (10), within the channel flanges (13) and (14) in the area of the farthest compartment (4) in FIG. 1 from the timer drive mechanism (8), the tab (17) of the trap door (15) is free to fall by gravitational forces through the opening or gap in the flanges, thereby opening the trap door (15) and dispensing the dry pet food from the first referenced compartment (4). The dry pet food will naturally fall downward as directed by the angled contour and shape of the shrouded collector trough identified by the numeral (16) which is attached to the main body and framework (1). The dry pet food will by this action be dispensed into any desired pet food receptacle. This sequence is further repeated as the draw bar (9) continues on its recoiling path towards the timer and past the additional openings (11) and (12) located in flange (13) and (14) for the additional food compartments (2) and (3). The compartment (3) respectively will be the next one to be dispensed of its food and compartment (2) after that. The trough (16) is attached to the main body and framework by means of a flanged lip identified by the numeral (19) in FIG. 1. Referring to FIG. 4, a cross sectional will illustrate the trough (6) is removable by simply lifting the structure off of the flanged lip (19). At this time, it should be pointed out that the drawings FIG. through FIG. 11 show differing perspectives an views of the present invention. These drawings may be further identified by specific numerals (1) through (26) which reference their features. These features may have already been reference in detail. To this end, it must be noted the identifying numerals are repetitious only in the fact that they are aiding the viewer's eye to more clearly identify and define what one is looking at. Only specific details that have not been touched upon in clearly defined detail will be further discussed.

Attention should next be directed to FIG. 3 of the drawings which is a differing perspective view of the present invention. Also illustrated are the wall securing tabs which are identified by the numeral (21) and are attached to the back of the main body and framework (1). A feeder receiving bowl or container is identified by the numeral (20). In FIG. 5, the present invention is shown from an overhead view showing contoured attachment points for intended add-on modules or more specifically two moulded vertical ribs identified by the numeral (25) which will be part of the moulded end panel of compartment (4). The first add-on module identified by the numeral (5) will have as part of its end wall structure, a channel identified by the numeral (26) which will be the reverse contour in order that the add-on module can easily slide over and around the vertical ribs (25). The base of the ribs will be slightly flanged to act as a stop for the add-on module (5). Each of the additional modular compartments will have its own lid and individual dispensing trough similar with the exception of dimensions to trough (16) of FIG. 1 and Lid (5) also illustrated in FIG. 1.

Your attention is next directed to FIG. 6 showing the vertical attachment rib (25) and rib channel (26) in greater detail. This coupling point is more clearly shown in perspective view 6A which illustrates the downward travel or sliding action of an add-on module (28) during the exercise of sliding said module over the ribs (25) attached to the mainframe of the present invention. FIG. 7 is a top view of the draw bar channel showing the upper flange (14) along food compartments (3) and (4). One of the transversed partitions (7) is also shown.

FIG. 8 is a further exercise showing the draw bar channel from a frontal view illustrating the gap between flange (13) and (14). Also shown is the trap door (15) with its integral tab (17) and how they fit in relation to the channel gap.

Figure 10:
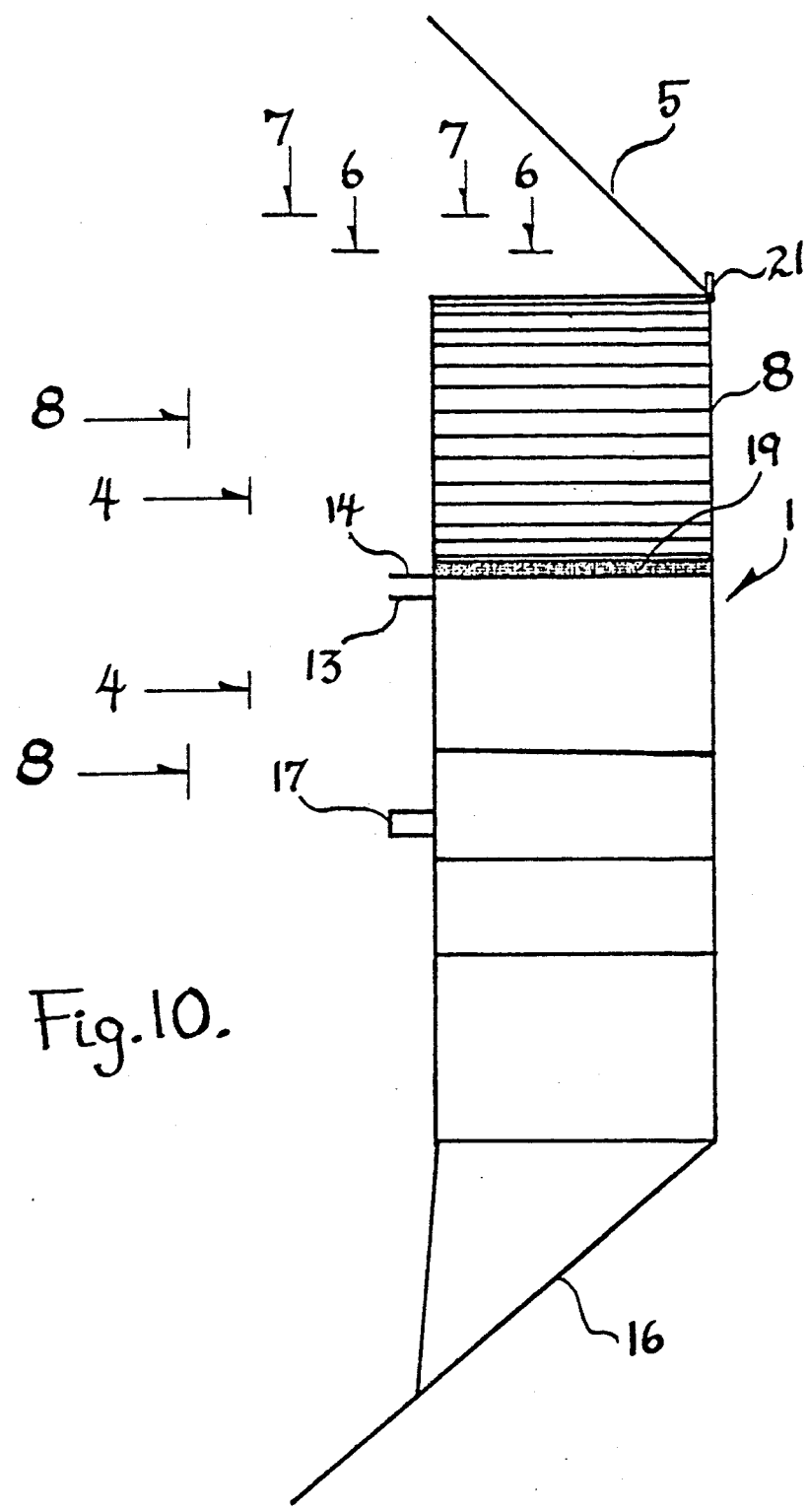
FIG. 10 is a schematic side view of the present invention taken along line 10—10 of FIG. 9.

Referring now to FIG. 9 which is a further illustration showing a frontal view of the trap door swinging to an open position. Attention should next be drawn to FIG. 10 which illustrates the present invention from a side view. This view will show the apparatus is intended to be mounted flush against a retaining wall. The height of the apparatus from the floor and receiving container or bowl is strictly determined by the length of the dry pet food trough (16) which is intended to be made available in varying lengths in order to keep the feeder out of reach of inquisitive animals.

Referring now to the final drawing. FIG. 11 is a differing frontal perspective view identifying further all of the elements which make up the present invention.

It is to be understood that, although one form of this invention has been illustrated and delineated, I am fully aware of the fact that many changes may be made in the contour and configuration of the parts without affecting their intended mechanical operativeness and I reserve the right to make such changes as I deem necessary without departing from the spirit of my invention or the scope of the appended claims.

I claim:

1. An apparatus for dispensing dry pet food in measured amounts at predetermined intervals over a several day period, comprising; a mechanical or electrical drive mechanism which, when activated, will rotate to recoil and uncoil a draw bar which will, in its extended position, support a trap door, said trap door being rotatably mounted at a bottom of a feed compartment, said trap door having an L-shaped tab as an integral part of said trap door, and the apparatus further including a channel shrouding any extended length of said draw bar and receiving said tab to allow said draw bar unobstructed recoiling and uncoiling movement therethrough, wherein recoiling said draw bar at a predetermined distance will release said trap door for dispensing measured amounts of food.

2. An apparatus for dispensing dry pet food as defined in claim 1, wherein said draw bar is rectangular-like in cross section and flexible, said movement of said draw bar being a measured distance for any given activation of said drive mechanism, thus allowing movement of said draw bar past said L-shaped tab to releasably support said trap door.

3. An apparatus for dispensing dry pet food as defined in claim 1, wherein said draw bar passes within said channel and underneath said L-shaped tab during said recoiling and uncoiling movement about a straight line.

4. An apparatus for dispensing dry pet food as defined in claim 2, wherein said apparatus includes a plurality of compartments, each compartment having a releasably rotatable trap door positioned at a bottom and are releasably supported by said draw bar and further including a lid.

5. An apparatus for dispensing dry pet food as defined in claim 4, wherein said each compartment includes a receiving member that releasably attaches an adjacent compartment, said plurality of compartments being proportionately sized to accommodate various measured amounts of feed for dispensing.

* * * * *